2,719,474
Patented Oct. 4, 1955

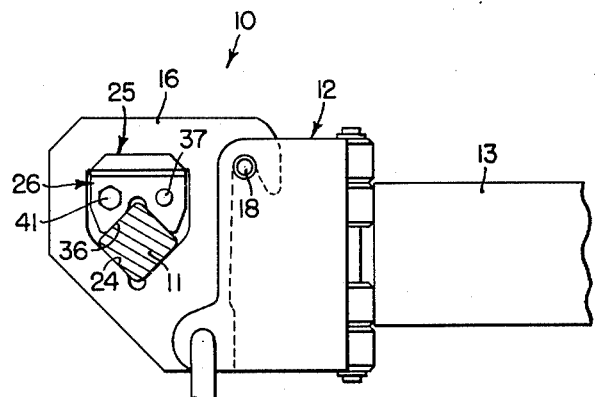
FIG. 1
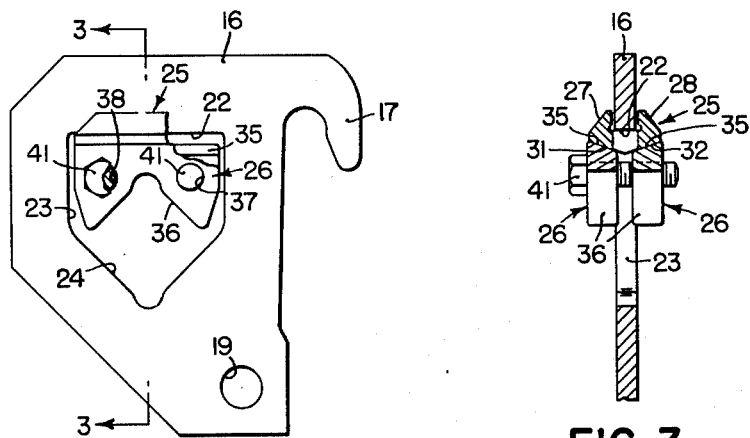
FIG. 2
FIG. 3
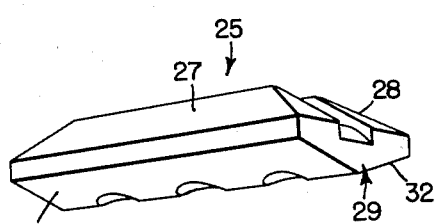
FIG. 4
INVENTOR.
JESSE G. LINDEMAN
ATTORNEYS _United States Patent Office_

2,719,474

TOOL CLAMP

Jesse G. Lindeman, Yakima, Wash., assignor to Deere & Company, Moline, Ill., a corporation of Illinois Application October 17, 1952, Serial No. 315,266

2 Claims. (Cl. 97—199)

The present invention relates generally to agricultural implements and more particularly to agricultural implements of the type including or connected with tool bars adapted generally to receive any one or more of a number of different kinds of implement units.

The object and general nature of the present invention is the provision of new and improved coupling means particularly adapted for connection to the tool bar of an agricultural implement or the like. More specifically, it is a feature of this invention to provide a new and improved coupling device in which relatively simple and easily fabricated parts are employed. Particularly, it is a feature of this invention to provide a coupling member for connection with the tool bar, said coupling member including a generally plate-like part having an opening therein adapted to receive the tool bar, with a separate generally U-shaped wedge block adapted to be carried by the plate-like part along one edge thereof, with clamping means acting against said wedge block and the adjacent face of the tool bar for locking the tool bar and coupling member together.

These and other objects and advantages of the present invention will be apparent to those skilled in the art after a consideration of the following detailed description, taken in conjunction with the accompanying drawings, in which:

Figure 1 is a side view showing coupling means, in which the principles of the present invention have been incorporated, of the type that is adapted to connect the transverse tool bar to a supporting structure, such as a tractor or the like.

Figure 2 is an enlarged side view showing the wedge block in place but with the tool bar removed.

Figure 3 is a sectional view taken generally along the line 3—3 of Figure 2.

Figure 4 is a perspective view of the wedge block.

Referring first to Figure 1, the present tool-bar-supporting device is indicated in its entirety by the reference numeral 10 and is shown as connecting a tool bar 11 with a pair of brackets 12, only one being shown in Figure 1, the brackets 12 being supported on a tractor or the like through sway links 13.

The coupling mechanism 10 of the present invention incorporates a flat plate-like member 16 having an upper hook 17 adapted to engage a pin 18 carried by the associated bracket 12, and a lower apertured portion 19 adapted to receive a connecting pin 21, connecting the lower portion of the plate-like member 16 with the lower portion of the bracket 12.

The plate-like member 16 is provided with a tool-bar-receiving opening 23 that is generally rectangular in shape except that one edge, such as the lower edge, is formed as a V-shaped notch 24 dimensioned to receive the lower half of the tool bar 11 which, in its preferred form is square in cross-section. The edge of the opening 23 opposite the V-shaped notch 24 is generally straight, as indicated at 22.

The bracket plate 16 is adapted to be fixed to the tool bar 11 by means of a detachable wedge block 25 and a pair of cooperating wedge members 26. As best shown in Figure 3, the wedge block 25 is formed as a substantially U-shaped member in section, having side portions 27 and 28 spaced apart a distance substantially equal to the thickness of the plate-like member 16, the side portions 27 and 28 being connected by a central section 29. The wedge block 25 is adapted to be inserted in the opening 23 with the edge 22 contacting the inner face of the central section 29 and with the side portions 27 and 28 engaging opposite sides of the plate bracket member 16. The portions of the side sections 27 and 28 are extended laterally to provide for a pair of oppositely angled camming surfaces 31 and 32 formed generally on the central connecting section 29 of the wedge block 25.

The two wedge members 26 cooperate with the wedge block 25. Each wedge member 26 is formed with an angled clamping surface 35 that is complementary with respect to the associated camming surface 31 or 32 on the wedge block 25. The opposite edge of each wedge member 26 is formed as a V-shaped notch 36 shaped to receive the side of the tool bar 11 opposite the side resting in the notch 24. Each of the wedge members 26 carries a pair of openings 37 and 38. The opening 37 is provided with screw threads to receive the threaded end of an associated cap screw 41. The other opening 38 is slightly larger than the opening 37 and is plain, being adapted to receive the shank of the associated cap screw 41. The wedge members 26, which are identical, are assembled as best shown in Figures 1 and 2 so that the threaded end of each cap screw is screwed into the tapped opening of the other wedge member.

In use, the plate-like bracket 16 is assembled on the tool bar 11 by passing the latter through the opening 23. Next the wedge block 25 is brought into position embracing the edge 22 and associated portions, and then the tool-bar-engaging wedge members 26 are assembled from opposite sides of the bracket 16 and block 25 and the cap screws 41 inserted from opposite sides. Then by tightening the cap screws, the wedge members 26 are shifted along the tool bar, and the cooperating camming surfaces 31, 32 and 35 cause the tool bar to be firmly and rigidly clamped between the notched portion 24 of the bracket plate 16 and the notched portions 36 of the wedge members.

While I have shown and described above the preferred structure in which the principles of the present invention have been incorporated, it is to be understood that my invention is not to be limited to the exact details shown and described above but that, in fact, widely different means may be employed in the practice of the broader aspects of my invention.

What I claim, therefore, and desire to secure by Letters Patent is:

1. A coupling member adapted to be connected to a tool bar or the like, said coupling member comprising a plate-like member of flat stock having flat parallel sides and an opening to receive a tool bar, a generally U-shaped wedge block disposable in said opening along one edge thereof in embracing relation, said opening being larger than said wedge block, whereby the latter may be brought freely into said opening into a position to engage at one side thereof said one edge of the coupling member opening and the portion of said wedge block that embraces said one edge of the coupling member opening comprising a slotted section extending substantially from one end of the wedge block to the other, said wedge block having at the other side thereof portions forming oppositely angled surfaces, one at each side of said bar-receiving opening, a pair of clamping members having complementarily formed angled camming surfaces angled to fit, respectively, against the oppositely angled surfaces of said wedge block, and means acting against said clamping members for moving one relative to the other along said angled surfaces of the wedge block for clamping the tool bar in said opening.

2. The invention set forth in claim 1, further characterized by the edge of said coupling member receiving said wedge block being straight and the portion of said wedge block embracing said edge being correspondingly straight from end to end.

References Cited in the file of this patent

UNITED STATES PATENTS

| | | |
|---|---|---|
| 1,749,135 | Harter | Mar. 4, 1930 |
| 2,302,863 | Hubbard | Nov. 24, 1942 |
| 2,303,881 | Hubbard | Dec. 1, 1942 |
| 2,616,349 | Lindeman et al. | Nov. 4, 1952 |